United States Patent [19]

Hayashi

[11] Patent Number: 4,537,449

[45] Date of Patent: Aug. 27, 1985

[54] VEHICLE WHEEL ATTACHING DEVICE

[75] Inventor: Masakazu Hayashi, Higashi-Osaka, Japan

[73] Assignee: Kabushiki Kaisha Hayashi Racing, Osaka, Japan

[21] Appl. No.: 482,978

[22] Filed: Apr. 7, 1983

[30] Foreign Application Priority Data

Dec. 24, 1982 [JP] Japan ................................ 57-228537

[51] Int. Cl.³ .......................... B60B 3/16; B60B 3/14; B60B 3/00
[52] U.S. Cl. ............................... 301/9 CN; 301/9 DN
[58] Field of Search ................. 301/9 R, 9 DH, 9 CN, 301/9 DN, 9 SC, 37 S, 37 SC, 108 SC

[56] References Cited

U.S. PATENT DOCUMENTS

| | | | |
|---|---|---|---|
| 1,375,900 | 4/1921 | Culp | 301/9 CN |
| 1,691,488 | 8/1922 | Ludwick | |
| 2,148,707 | 2/1939 | Notson | 301/9 DH |
| 4,217,002 | 8/1980 | Simpson | 301/37 S |
| 4,274,679 | 6/1981 | Brinson | 301/37 SC |

FOREIGN PATENT DOCUMENTS

| | | | |
|---|---|---|---|
| 289569 | 4/1971 | Austria . | |
| 728895 | 12/1931 | France . | |
| 0988302 | 6/1949 | France | 301/9 CN |
| 1504385 | 12/1965 | France | 301/9 DH |
| 46-18642 | 5/1971 | Japan . | |
| 53-38701 | 4/1978 | Japan . | |

Primary Examiner—David A. Scherbel
Assistant Examiner—Dennis C. Rodgers
Attorney, Agent, or Firm—Armstrong, Nikaido, Marmelstein & Kubovcik

[57] ABSTRACT

A vehicle wheel attaching device for removably attaching general-road traveling wheels to the hubs of a vehicle by utilizing an independent adapter in such a manner as to enable transmission of torque. The adapter is made approximately in the form of a top hat as a whole and is bent at its top to form a dish spring surface for contact with the head of a center bolt which is pre-fitted thereto so as to extend therethrough. A center nut is applied to the projecting front end of the bolt, the nut being tightened to cause elastic action of the top surface of the adapter, thereby fixing the wheel in position in a non-rigid condition.

5 Claims, 8 Drawing Figures 4,537,449

VEHICLE WHEEL ATTACHING DEVICE

BACKGROUND OF THE INVENTION

Devices for interchangeably attaching wheels to the hubs of a vehicle, particularly automobile, traveling on general roads, unlike racing cars and sport cars, in such a manner as to enable transmission of torque have already been proposed for example in Japanese Patent Publication No. 18642/1971 and Japanese Utility Model Application Disclosure No. 38701/1978. The former is thought to be applied to press-worked steel wheels and the latter, which I previously proposed, is directed to wheels cast of aluminum alloys and has been in practical use.

These known wheel attaching devices, however, though useful for their rapidity of mounting and dismounting wheels, have the following problems to be solved. Since the two are thought to be substantially the same in construction, the former invention will be taken as an example. Since it comprises simply an adapter or sleeve which is externally threaded, and a center nut applied thereto, the fixed condition of the wheel established by tightening the nut is rigid, with the result that the thread coupling portion tends to be damaged by stress concentration and is subjected to repeated vibrations and shocks during traveling of the automobile, causing the center nut to rattle and become loosened easily.

The adapter is substantially in the form of a cylinder of sufficiently large diameter to cover the hub of the automobile and adapted to press the wheel against the hub by a center nut applied thereto to cover the opening in the adapter. The nut itself is extremely large in size and is a special part requiring a large tightening force, so that the wheel mounting and dismounting operation cannot be performed lightly and efficiently by using a common small-sized tool. Since such a large sized nut is exposed at the middle of the wheel, it is difficult to employ an aesthetic design for the wheel as desired, so that it is impossible to provide wheels having various attractive-looking features, a fact or which is disadvantageous in decorating the automobile with changeable wheels.

Further, as drive connecting elements for transmitting the torque from the automobile to the wheel, the conventional device uses stud bolts and nuts for attaching the wheel to the hub, the cylindrical portions of the nuts being fitted in cylindrical sockets or recesses formed in ribs of the wheel. With this arrangement, however, in performing the operation of fitting and assembling the nuts in the sockets or recesses at the site of wheel exchange, it often becomes necessary to correct the wall surface of the socket opening as by local cutting, an operation which is very troublesome to perform at the site. It is difficult to ensure high accuracy in said fitting and assembling operation in the stage of mass-production of wheels in the factory; thus, there is a variation in the processing accuracy, making it impossible to obtain the frictional force necessary for transmission of torque. The same may be said of a case where instead of said nut, the head of the stud bolt is fitted in the socket or recess. Thus, said high accuracy cannot be attained without imposing restrictions on the manufacture and processing of wheels.

SUMMARY OF THE INVENTION

The present invention has been accomplished to provide improvements in view of the problems described above. Accordingly a first object of the invention is to bend the top surface of the adapter to form a dish spring surface for contact with the head of the center bolt, so that when the bolt is tightened, the top surface is caused to act elastically to fix the wheel in a non-rigid condition while preventing stress concentration in the thread coupling portion and effectively absorbing vibration and shock during traveling, thus preventing loosening of the nut and increasing safety.

A second object is to assemble the center bolt to the center of the adapter in advance so that it outwardly projects through the top surface of the adapter to allow a center nut to be applied from outside of the wheel to the projecting front end of the bolt, thereby making it possible to use a small-sized common nut as such center nut so that the wheel can be lightly fixed in position with a small tightening force and hence it can be dismounted while ensuring, in providing a desired form or variation as an external design for the wheel, that there is no restriction imposed by the center nut.

A third object of the invention is to attach the adapter at its flaring flange to a hub of the automobile by a plurality of bolts and nuts, while a plurality of torque pins fixed to the wheel independently of the region clamped by said bolts and nuts are provided as drive connecting elements for transmitting the torque from the hub to the wheel, so that the friction contact condition or high accuracy for fitting and assembling necessary for transmission of torque can be obtained in the stage of mass-production of wheels in the factory, with a minimum of restriction on manufacture and processing so as to eliminate the need for correcting variation at the site of wheel exchange, while making it possible to provide the wheel at low cost. Other objects will become apparent together with the concrete arrangement of the invention from the following description of an embodiment thereof.

DESCRIPTION OF THE PREFERRED EMBODIMENT

Figure 1:
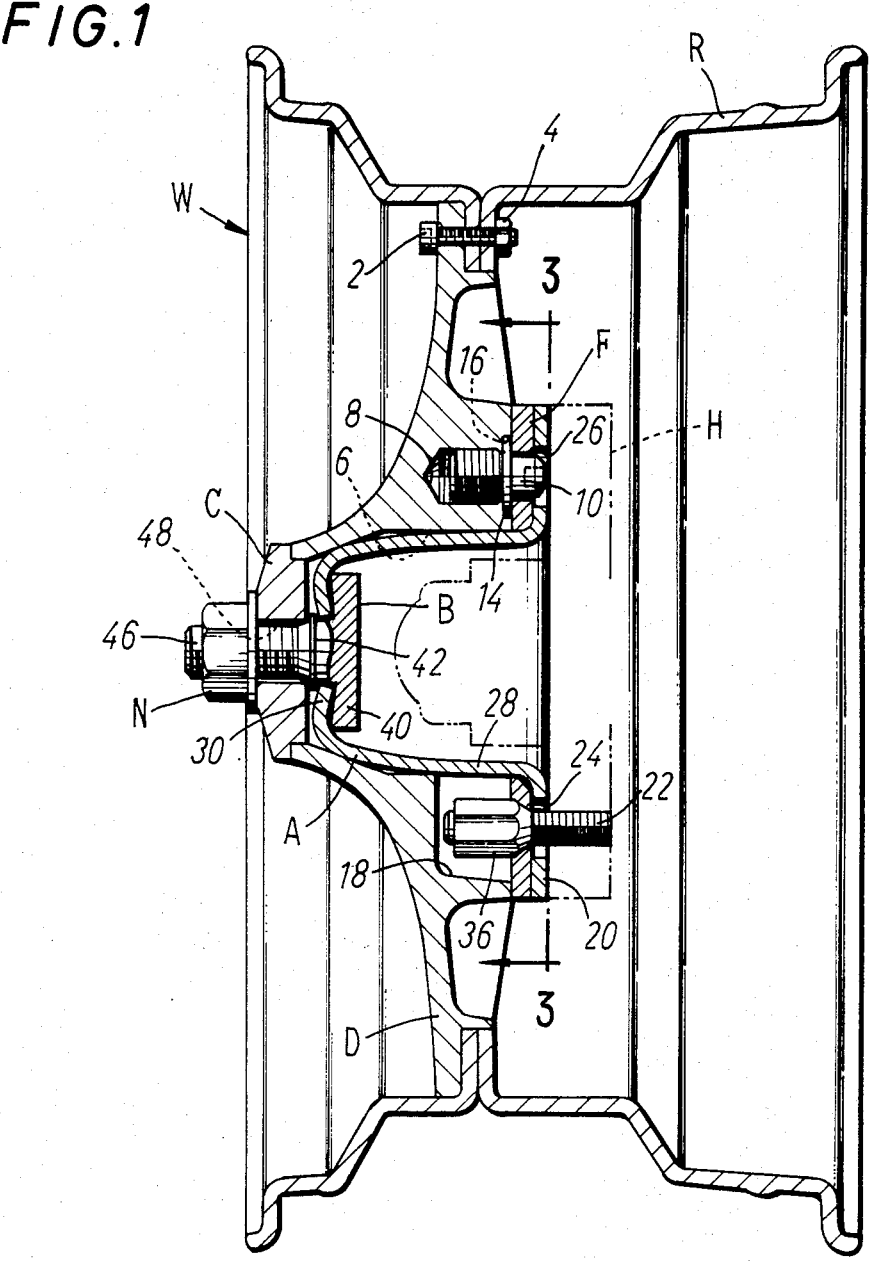
FIG. 1 is a side view showing a wheel in attached working condition in the present invention.
Figure 2:
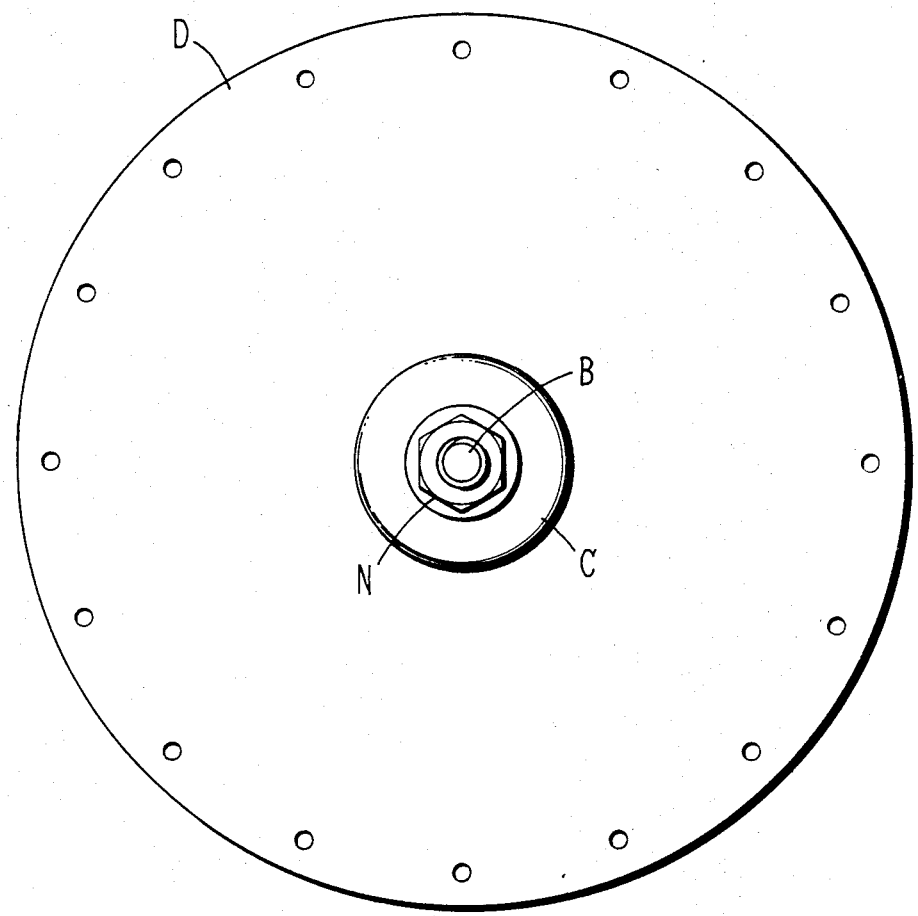
FIG. 2 is a front view of the wheel with its rim omitted.
Figure 3:
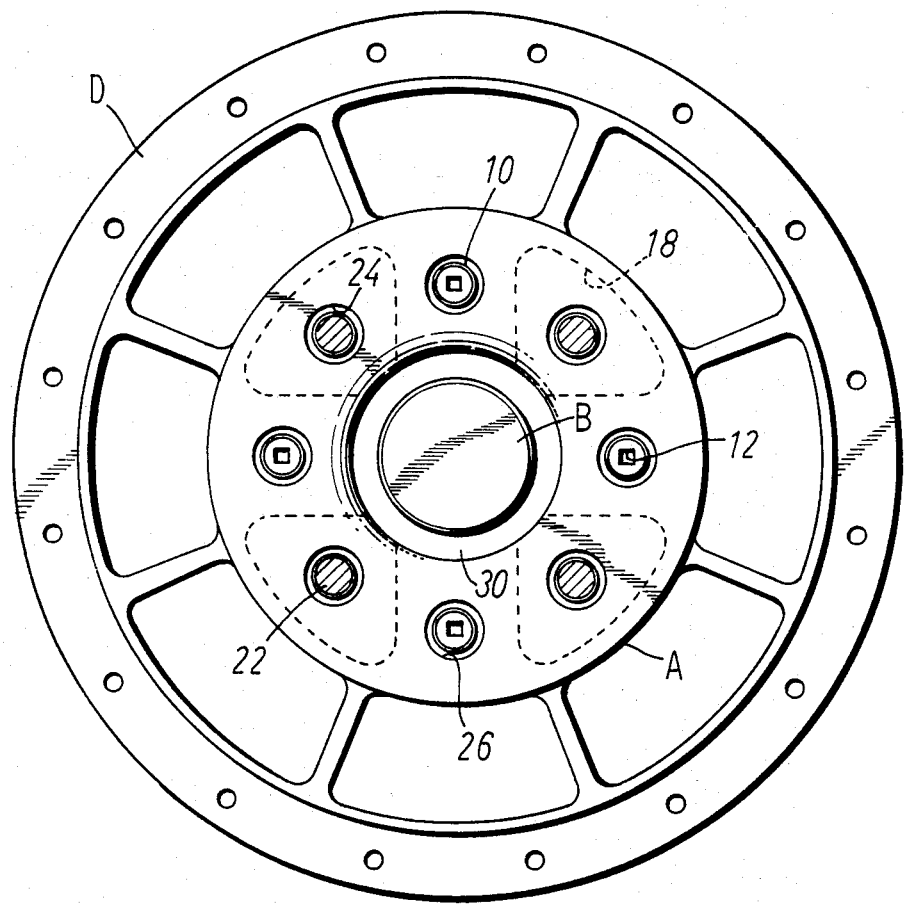
FIG. 3 is a sectional view taken along the line 3—3 in FIG. 1, with the rim also omitted.
Figure 4:
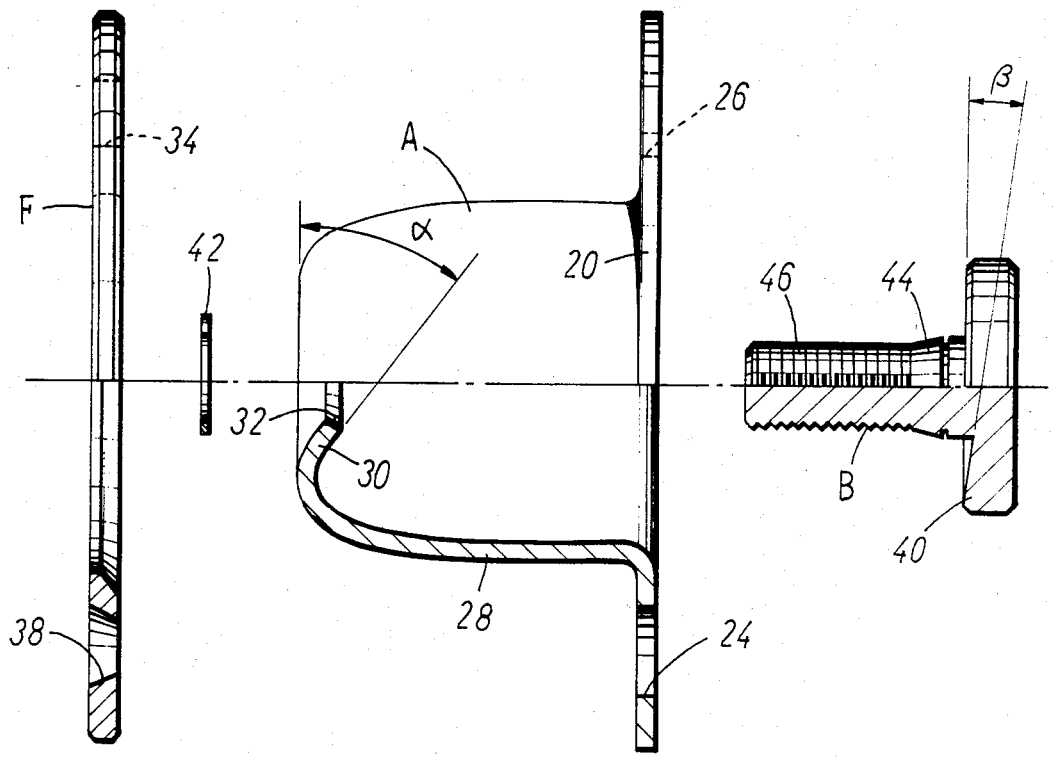
FIG. 4 is an exploded view, in half-section, of the principal portion of the invention.
Figure 5:
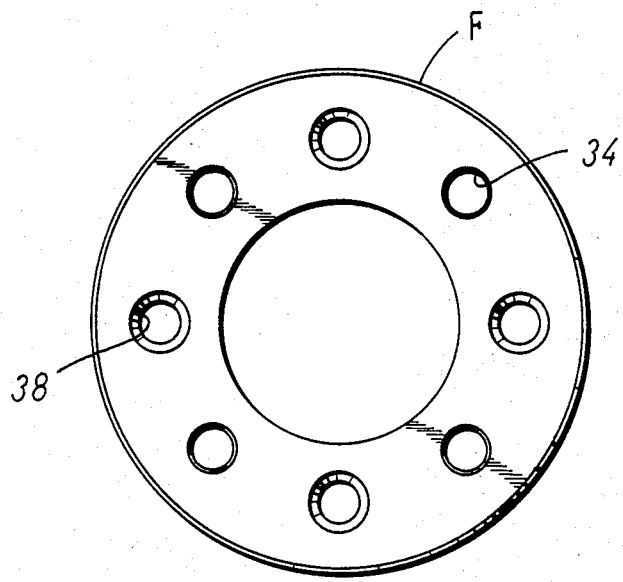
FIG. 5 is a front view of fitting plate shown in FIG. 4.

The concrete arrangement of the invention will now be described with reference to the drawings. In FIGS. 1-5, W denotes a wheel of an automobile traveling on general roads, comprising a rim R and a disk D which are assembled together by a plurality of bolts 2 and nuts 4. The invention is applicable not only to such a built-up wheel consisting of a plurality of pieces but also to a one-piece wheel. As for the material and method of manufacture of the wheel, the wheel may be produced by casting an aluminum alloy material or by pressing a steel or aluminum alloy material.

The numeral 6 denotes an axial hole of relatively large diameter formed centrally through the wheel disk D, and 8 denotes a plurality of threaded holes (four in the illustration) formed in the disk D from the inside thereof and radially and symmetrically arranged with respect to the rotary axis of the wheel W. The numeral 10 denotes a plurality of torque pins which are threadedly pre-fitted in the threaded holes 8, said pins projecting a predetermined amount beyond the attaching surface of the disk D. The numeral 12 denotes square recesses formed in the projecting front ends of the torque pins for engagement by a turning tool for tightening said pins 10. The numeral 14 denotes stops flaring outwardly from the middle portions of the pins 10, said stops being fitted on recessed step surfaces 16 formed in the disk D around the edges of the openings of the threaded holes 8, thereby preventing tilting and off-centering of the pins 10. The numeral 18 dentoes a plurality of clearance recesses (four in the illustration) formed in the disk D below its attaching surface and associated with wheel attaching bolts and nuts to be later described.

The character A denotes an adapter for interchangeably attaching the wheel W to a hub H of the automobile and made approximately in the form of a top hat having a uniform wall thickness, preferably press formed. The numeral 20 denotes a flaring flange of adapter A which is adapted to be connected to the hub H and which has a plurality of radially symmetrically arranged loose-fitting holes 24 (four in the illustration) for receiving stud bolts 22 outwardly projecting from the hub H, and a plurality of radially symmetrically arranged clearance holes 26 (four in the illustration) for clearing the torque pins inwardly projecting from the disk D. While the loose-fitting holes 24 and clearance holes 26 are shown as having the same size and shape, their configuration and arrangement may be made different so that they can be distinguished from each other.

The numeral 28 denotes the cylindrical arched cap barrel of the adapter A, outwardly projecting to enter the axial hole 6 of the disk D, the top surface of said barrel having been pre-formed to provide an inwardly projecting conical dish spring surface 30. That is, the top surface of the adapter A is provided with a predetermined angle of inclination $\alpha$ so that the top surface can be elastically deformed when subjected to an axially directed pulling force exerted by a center bolt to be later described, said dish spring surface 30 having a bolt receiving hole 32.

The character F denotes a fitting plate interposed between the attaching surface of the disk D and the flaring flange 20 of the adapter A and formed with a plurality of radially symmetrically arranged holes 34 for receiving the torque pins 10 and a plurality of radially symetrically arranged conical holes 38 for receiving taper nuts 36 applied to the stud bolts 22. The fitting condition is such as to ensure sufficient frictional contact to cause the torque pins 10, bolts 22 and nut 36 to act as drive connecting elements to transmit the torque from the hub H to the wheel W. Of course, the fitting condition cannot be seen from the outside of the wheel W.

In the illustration, the number of torque pins 10 is the same as the number of nuts 36 (four in number), but the number of nuts 36 may be smaller than the number of pins 10 and their arrangement positions may be made radially different from each other. Further, the fitting plate F may be omitted and instead the adapter A, particularly its flaring flange 20, may be increased in wall thickness to compensate for the absence of the fitting plate. This is because such an arrangement is worthy of employment so long as uniform accuracy can be imparted to the flange 20 for connection between the attaching surface of the disk D and the hub H. However, according to the illustrated arrangement using the independent plate F, even if the processing accuracy of the adapter A is low and the flange 20 is distorted, such nonuniformity or variation can be compensated for by the interposition of the plate F, which means that little restriction is imposed on the manufacture of the adapter A and hence mass production is made possible by easy and convenient press work, while the resulting uniformity enables assembling accuracy to be increased. In this respect, the use of the plate F is more advantageous.

The character B denotes a center bolt assembled to the cap barrel 28 of the adapter A to extend therethrough from the inside thereof, and which has a head 40 of relatively large diameter adapted to contact the dish spring surface 30 on the top of the adapter. In the illustration, the contact surface of the bolt head 40 has a predetermined angle of inclination $\beta$ preferably somewhat smaller than the angle of inclination $\alpha$ of the dish spring surface. However, such angle is not absolutely necessary, provided that elastic action can be produced between the contact surfaces. The numeral 42 denotes a stop ring fitted on the neck of the bolt B, thus preventing the bolt B from slipping off the adapter A. The numeral 44 denotes a step portion, preferably tapered, formed in the boundary between the neck and the threaded portion 46 of the bolt.

Figure 8:
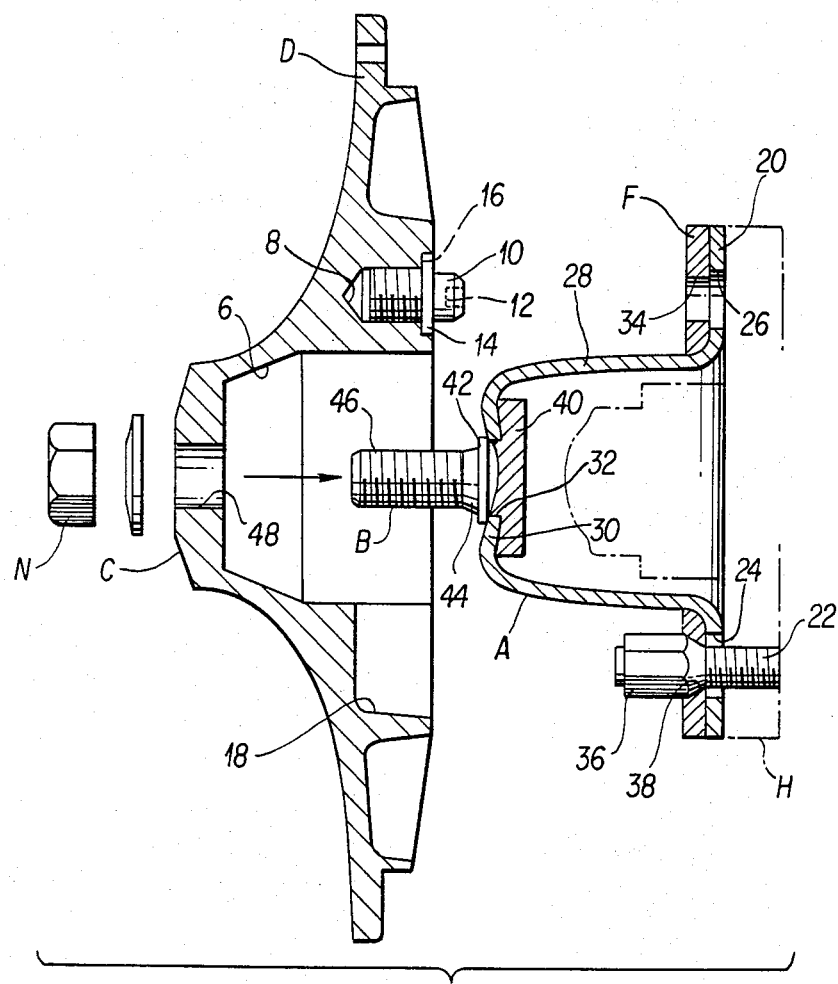
FIG. 8 is a side view, in section corresponding to FIGS. 1 and 6, showing attachment of a wheel having integrally formed disc and collar portions.

The character C denotes a stepped center collar fitted to the edge of the opening of the hole 6 of the disk D to cover the axial hole 6. It goes without saying that the center collar is centrally formed with a through hole 48 for the center bolt B to pass therethrough. So long as the through hole 48 is provided, the collar C may be integrated with the disk D as shown in FIG. 8. However, if it is formed as a separate independent part, as in FIGS. 1 and 6, adapted to be removably fitted to the disk D, this is convenient in that a large-sized tool necessary for exchange of tires can be more easily inserted into the axial hole 6 of large diameter after the collar C has been removed. The character N denotes a center nut applied to the threaded portion of said center bolt B from the outside of the wheel W. When the nut is tightened, the dish spring surface 30 of the adapter A is pressed to be elastically deformed by the head 40 of the bolt B, so that their surfaces are substantially closely contacted with each other, whereby the dish spring surface is maintained in a non-rigid stabilized fixed condition.

Figure 7:
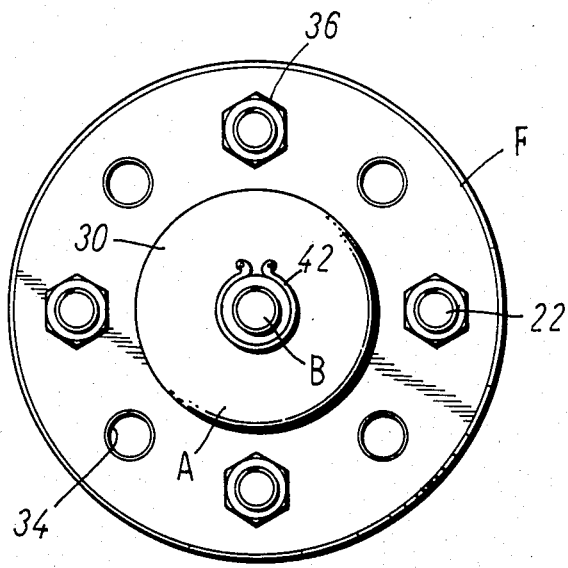
FIG. 7 is a front view taken in the direction of the arrow in FIG. 6.
Figure 6:
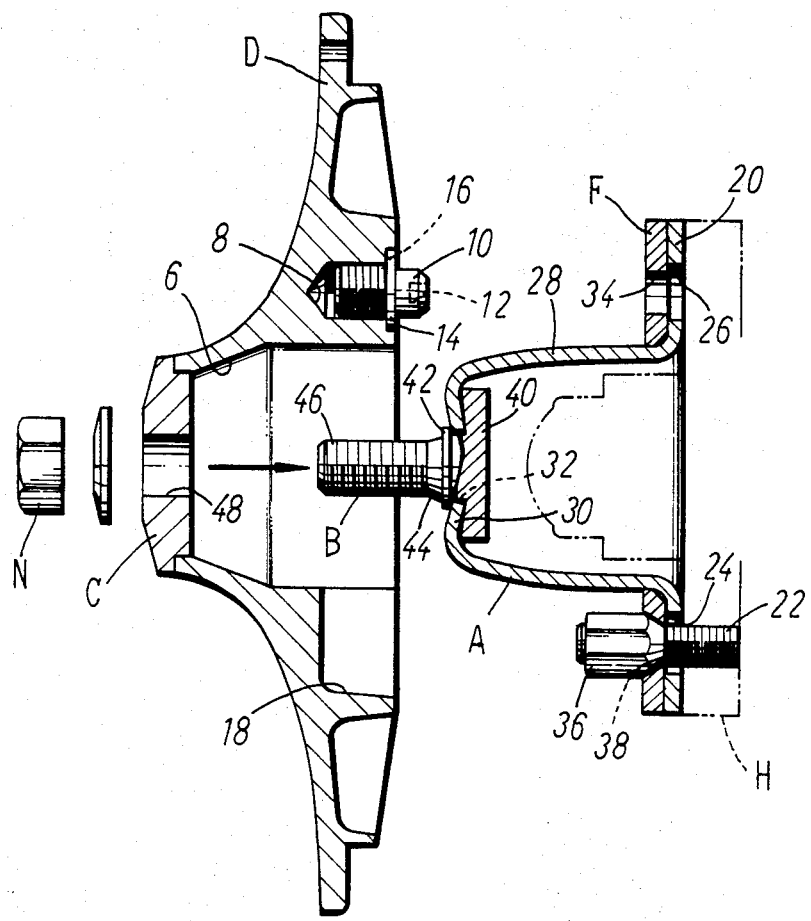
FIG. 6 is a side view, in section, corresponding to FIG. 1, showing how to detach the wheel.

In the arrangement described above, attachment of the wheel W to the hub H of the automobile is effected, as can be seen from FIGS. 6 and 7, by connecting the flange 20 of the adapter A to the hub H, placing the fitting plate F thereon, applying the taper nuts 36 to the stud bolts 22 projecting from the hub H so as to fix the fitting plate in position, placing the wheel disk D so that the torque pins 10 are received in the pin receiving holes 34 of the plate F, fitting the center collar C from the outside, in the manner of a cover, to the axial hole 6 of the disk D so that the center bolt B projecting from the top surface of the adapter A extends through the collar C, and tightening the center nut N threadedly engaged on the bolt B. In this case, since the nut N is a small-sized and common one to be threadedly engaged on the threaded portion 46 of the bolt B, small tightening force is sufficient and where a desired exterior design for the wheel W is adopted, there is no restriction imposed by the center nut N. Conversely, detachment can be effected by unscrewing the nut N and then outwardly pulling the wheel W. At any rate, turning the single center nut N enables the wheel W to be mounted and dismounted efficiently, and in this sense the invention is quite suited for exhange of wheels.

In the attached condition of the wheel, the disk D is fitted to and supported by the adapter A in a stabilized manner, and the torque of the hub H is transmitted smoothly and without any loss to the wheel W successively through the stud bolts 22, taper nuts 36, fitting plate F, and torque pins 10. That is, the threaded clamping bodies, or said center bolt B and center nut N, do not take part in the transmission of torque, which is effected by the wheel attaching stud bolts 22 and center nuts 36 and the torque pins 10 serving as drive connecting elements. In this case, not only the bolts 36 for attaching the wheel to the hub H but also the torque pins 10, which are independent thereof, are employed as drive connecting elements, whereby the transmission of torque is effected in a stepwise manner. Since the torque pins 10 are held by and integrated with the wheel W in advance in the stage of mass-production of wheels in the factory, it is no longer necessary to perform the troublesome operation of correcting the torque pins at the site of change of the wheel W so as to obtain the necessary frictional force for transmission.

At any rate, the invention is directed to the wheels of vehicles traveling on general roads. According to the invention, in removably attaching the wheel to the hub of the automobile through an independent adapter in such a manner as to enable transmission of torque, the adapter is made approximately in the form of a top hat as a whole, the top surface thereof is bent to provide a dish spring surface for contact with the center bolt, the latter being assembled in advance to the adapter so that it extends outwardly through the adapter, and the nut applied to the projecting front end of the bolt from the outside of the wheel is tightened to cause the top surface of the adapter to act elastically, thereby fixing the wheel in non-rigid condition. Thus, the previously described intended objects can all be attained, and the invention is a useful improvement invention.

What is claimed is:

1. A vehicle wheel attaching device for removably attaching wheels to the hubs of a vehicle, comprising
    an adapter attachable to a hub of the vehicle, said adapter being formed generally in the shape of a top hat having a cylindrical barrel portion with a top cap and an outwardly radially extending flaring flange at top and base ends thereof, respectively, said top cap being provided with an axially inclined inwardly projecting conical dish spring surface with a central axial bolt-receiving hole therethrough, said flange being provided with a plurality of radially symmetrical stud bolt-receiving holes and a plurality of radially symmetrical torque pin clearance holes therethrough;
    an annular fitting plate substantially corresponding in diameter to said flange and having a central hole accommodating said cylindrical barrel portion of said adapter, said fitting plate being provided with a plurality of radially symmetrical conical taper nut-receiving holes and a plurality of radially symmetrical torque pin-receiving holes, said plurality of taper nut-receiving and torque pin receiving holes of said fitting plate corresponding in number and location with said plurality of stud bolt-receiving and torque pin clearance holes, respectively, of said adapter so as to be alignable therewith; and
    a center bolt provided with a threaded portion, and a head having an axially inclined contact surface having an angle of inclination less than the angle of inclination of said top cap of said adapter and a diameter greater than the diameter of said central axial bolt-receiving hole of said adapter;
    wherein said adapter may be mounted to a hub of the vehicle with said stud bolt-receiving holes of the adapter engaged over corresponding stud bolts of the hub and with said threaded portion of said center bolt protruding outwardly through said central axial bolt-receiving hole of the adapter such that said contact surface of said center bolt contacts an inner surface of said top cap; said fitting plate may then be mounted to the hub over said adapter with said taper nutreceiving holes engaged over corresponding stud bolts of the hub such that said fitting plate and said adapter may be clamped to the hub with taper nuts applied to the stud bolts of the hub and engaging said taper nut-receiving holes of said fitting plate; and a wheel may be then mounted onto the hub by placing the wheel onto said barrel portion of said adapter and said fitting plate, a plurality of torque pins carried by the wheel aligning with corresponding said torque pin clearance holes of said adapter and being received by corresponding said torque pin-receiving holes of said fitting plate, a center hole of the wheel being fitted onto said threaded portion of said center bolt;
    whereby the wheel may be then removably attached to the hub by applying a center nut to said center bolt such that tightening of said center nut on said center bolt causes said head portion of said center bolt to cause elastic deformation of said top cap of said adapter so as to maintain the wheel in a non-rigid fixed stabilized condition on said adapter, torque being transmitted from the hub successively through said stud bolts, said taper nuts, and said fitting plate to the torque pins carried by the wheel.

2. A vehicle wheel attaching device in accordance with claim 1 wherein wheels to be attached to the hubs are provided with a plurality of radially symmetrical threaded holes, torque pins being threadedly engaged in said threaded holes so as to project therefrom.

3. A vehicle wheel attaching device in accordance with claim 1 wherein wheels to be attached to the hubs are formed with recesses in the inner sides thereof, said recesses providing clearance for said stud bolts when the wheels are attached to the hubs.

4. A vehicle wheel attaching device in accordance with claim 1 wherein said center bolt is captively secured in said central axial bolt-receiving hole of said adapter by a stop ring fitted onto a neck portion of said center bolt outwardly of said top cap of said adapter mediately said threaded portion extending through said bolt-receiving hole and said head, said stop ring having an outer diameter greater than said bolt-receiving hole.

5. A vehicle wheel attaching device in accordance with claim 1 wherein said cylindrical barrel portion of said adapter is formed with a shape closely conforming with an axial center bore of a wheel to be attached to the hubs of the vehicle so as to closely fit thereinto, and the wheel is provided with an annular collar removably fitted in an outer end of said axial center bore, said collar having a center hole therethrough sized to be fitted onto said center bolt.

* * * * *